Patented May 14, 1946

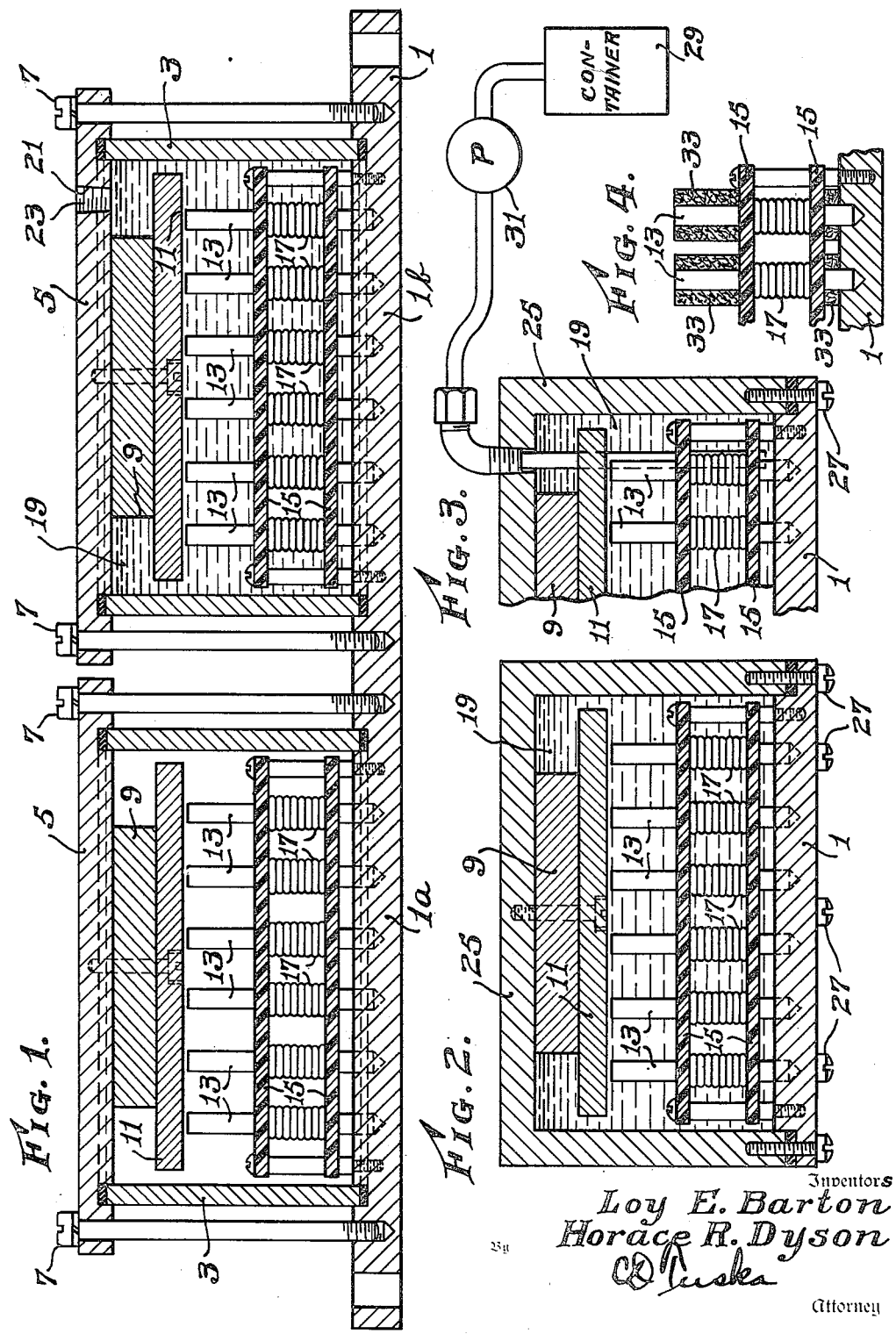

2,400,063

UNITED STATES PATENT OFFICE 2,400,063

SIGNALING APPARATUS

Loy E. Barton, Collingswood, and Horace R. Dyson, Haddonfield, N. J., assignors to Radio Corporation of America, a corporation of Delaware Application November 26, 1942, Serial No. 467,043

11 Claims. (Cl. 177—386)

This invention relates to signaling apparatus, and more particularly to electro-acoustic transducers of the magnetostrictive type used especially in submarine signaling.

Experience has shown that echo soundings can be made satisfactorily with projectors or transducers of this type when operating at relatively great depths in water. The minimum depth at which such projectors are effective is approximately five to six fathoms. For soundings in shallow water, conventional magnetostrictive projectors are not suitable for the reason that their acoustic decay time is too great to permit soundings.

The primary object of our present invention is to provide an improved magnetostrictive projector which will be free from the aforementioned limitation.

More particularly, it is an object of our present invention to provide an improved magnetostrictive projector which can be used effectively in shallow water.

Another object of our present invention is to provide an improved magnetostrictive projector as aforesaid which possesses an increased decrement over similar projectors heretofore known.

Still another object of our present invention is to provide an improved magnetostrictive projector of the type set forth which has a high sensitivity.

It is also an object of our present invention to provide an improved magnetostrictive projector of the type set forth which is relatively simple in construction, inexpensive in cost, and highly efficient in use.

In accordance with our invention, we make use of a magnetostrictive projector, which operates as a resonant system at some particular frequency, and we add to the projector, around the magnetostrictive elements thereof, a suitable damping medium, such as oil, oil saturated felt, or the like, which serves to damp the vibration of these elements. Damping the magnetostrictive elements in this manner renders the projector effective at depths of one fathom or less because the decay time of pulses emitted by the projector is substantially reduced thereby. However, the maximum depth over which the projector is then effective is correspondingly decreased. To eliminate this disadvantage, we may provide a storage tank or container in which the oil may be placed and which is connected to the projector housing by a reversible pump. When soundings are to be taken in shallow water, the oil can be pumped into the projector housing, and, conversely, when soundings are to be taken in deep water, the oil can be pumped out of the projector housing and back into the storage tank.

According to another form of our invention, the diaphragm of a magnetostrictive projector which operates at a resonant frequency may be thinned out somewhat over a predetermined annular area to provide a reservoir for oil around approximately ten percent to twenty percent of the magnetostrictive elements, these elements alone being operated in shallow water. When, however, it is desired to take soundings in deep water, the other, undamped magnetostrictive elements may be operated in the usual manner.

In accordance with still another form of our invention, a pair of magnetostrictive projectors may be provided, one of which will be effective in shallow water and the other in deep water. For this purpose, two separate housings may be connected to a single diaphragm having two active portions, one associated with one housing and the other with the other housing. In each of the housings there are a plurality of magnetostrictive elements connected to their associated diaphragm portion, but only one of the housings is filled with oil or other suitable damping fluid. With this arrangement, either one of the projector units may be operated at will, or both may be operated simultaneously and readings taken from that one which is suitable at the particular depths being ranged.

The novel features that we consider characteristic of our invention are set forth with particularity in the appended claims. The invention itself, however, both as to its organization and method of operation, as well as additional objects and advantages thereof, will best be understood from the following description of several embodiments thereof, when read in connection with the accompanying drawing, in which Figure 1 is a central, sectional view of one form of magnetostrictive projector according to our invention and embodying two discrete units, one of which is effective at relatively short depths and the other at relatively great depths, Figure 2 is a central, sectional view of a somewhat different form of our invention suitable for use only at shallow depths, Figure 3 is a view partly in section and partly diagrammatic showing still another form of our invention, Figure 4 is a fragmentary detail of another form of magnetostrictive projector in accordance with our present invention.

Referring more particularly to the drawing, wherein similar reference characters indicate corresponding parts throughout, there is shown, in Fig. 1, a diaphragm 1 having active circular sections or portions 1a and 1b spaced somewhat from each other and each recessed to receive an annular drum 3 constituting an upright wall closed at the upper end by a suitable closure 5 in each case. The drums 3 and their associated closures 5 constitute a housing closed at one end and are secured in place by bolts or the like 7 which hold the diaphragm 1 over the normally open ends of the two housings.

The diaphragm 1, the drums 3 and the closures 5 are all made of magnetic material. Secured to the closures 5 are magnets 9 and magnetic plates 11. A plurality of magneto-strictive, tubular elements 13 are housed within each of the housings above described, the tubes of one housing being secured to their associated diaphragm portion 1a and those of the other housing being similarly secured to their associated diaphragm portion 1b. The tubes 13 pass through aligned openings in a pair of spaced, non-magnetic plates 15 in each of the housings and terminate in proximity to the magnetic plates 11, a separate winding or coil 17 surrounding each of the magnetostrictive elements 13. The windings 17 may be connected either in series or parallel relation, as may be deemed most suitable, and they are coupled to a suitable oscillation generator (not shown) in well known manner.

As described thus far, both of the projector units are identical and both operate as resonant systems in known manner. However, one of the units, for example, the unit including the diaphragm portion 1b, may be filled with a suitable damping fluid 19, such as castor oil, light mineral oil, or the like (SAE-30 lubricating oil having been found satisfactory), or any other suitable damping medium may be used. The damping liquid 19 may be introduced through an opening 21 in the plate 5, the opening being closed by a suitable stopper 23. The other projector unit is of more or less conventional design and is filled with air. The latter unit is, therefore, effective over relatively great depths, while the unit filled with oil is effective only at relatively shallow depths by reason of the damping effect which the oil 19 has on the associated tubes 13.

The modification of our invention shown in Fig. 2 is quite similar to that one of the two units above described which includes the diaphragm portion 1b. In the modification of Fig. 2, however, the housing 25 is made of one integral member and the damping fluid 19 is introduced through the normally open end of the housing 25 before the diaphragm 1 is secured thereto, as by bolts 27. Once this form of our invention is assembled, as shown in Fig. 2, it is suitable for use only in shallow water.

In Fig. 3, we have shown a further modification of our invention employing a single projector unit, as in Fig. 2, but this unit is arranged to be effective in deep water as well as in shallow water. For this purpose, there is provided a suitable tank or container 29 which is connected to the housing 25 through a reversible fluid pump 31. When the projector is to be used in shallow water, the pump 31 is operated to pump the damping fluid 19 out of the container 29 and into the projector housing 25. However, when the projector is to be used in deep water, the pump 31 is operated in the reverse direction to withdraw the damping fluid 19 from the housing 25 and return it to the container 29.

Instead of filling the projector housing with oil or other liquid for damping vibrations of the magnetostrictive elements 13, there may be placed around these elements sleeves 33 of felt or other fibrous material saturated with oil or other suitable damping liquid. The sleeves 33 may be applied around both the upper and lower ends of the tubes 13, as shown in Fig. 4, or only at one end thereof, as may be found most suitable.

From the foregoing description, it will be apparent to those skilled in the art that we have provided an improved magnetostrictive projector which is not only effective in shallow water, but which can also be rendered effective in deep water as well. Although we have shown and described several embodiments of our invention, it will be apparent to those skilled in the art that many other forms thereof are possible. For example, one form previously mentioned includes thinning out a portion of the diaphragm (for example, an annular portion adjacent to the periphery) to provide a trough or reservoir in which oil may be placed around the lower ends of the elements 13 for damping only those magnetostrictive elements with which the damping fluid is in contact. These particular magnetostrictive elements would be effective in shallow water, whereas the other ones would be effective in deep water. Various other changes will, no doubt, readily suggest themselves to those skilled in the art. We desire, therefore, that our invention shall not be limited except insofar as is made necessary by the prior art and by the spirit of the appended claims.

We claim as our invention:

1. An electro-acoustical transducer including a vibrating system resonant at some particular frequency and useful for soundings in shallow water, said transducer comprising an acoustic diaphragm, magnetostrictive means secured to said diaphragm, a winding associated with said magnetostrictive means, and damping means surrounding at least a part of said magnetostrictive means for damping vibration thereof whereby to substantially reduce the decay time of pulses emitted by said vibrating system.

2. An electro-acoustical transducer including a vibrating system resonant at some particular frequency and useful for soundings in shallow water, said transducer comprising an acoustic diaphragm, a plurality of magnetostrictive elements secured to said diaphragm, a separate winding associated with each one of said elements, and damping means associated with at least certain of said elements for damping vibration thereof whereby to substantially reduce the decay time of pulses emitted by said vibrating system.

3. An electro-acoustical transducer including a vibrating system resonant at some particular frequency and useful for soundings both in deep water and shallow water, said transducer comprising an acoustic diaphragm, a plurality of magnetostrictive elements secured to said diaphragm, a separate winding associated with each one of said elements, and damping means removably associated with said elements for damping vibrations thereof, the decay time of pulses emitted by said vibrating system being relatively long when said damping means is removed from said elements whereby said transducer is useful for soundings in deep water, and the decay time of such pulses being substantially reduced when said damping means is applied to said elements whereby to render said transducer useful for soundings in shallow water.

4. An electro-acoustical transducer including a vibrating system resonant at some particular frequency and useful for soundings in shallow water, said transducer comprising means providing a housing closed at one end and normally open at its other end, an acoustic diaphragm secured to said housing and closing off said normally open end, a plurality of magnetostrictive elements within said housing secured to said diaphragm, a separate winding associated with each one of said elements, and a damping medium within said housing surrounding said elements, said damping medium being effective to damp vibration of said elements whereby to substantially reduce the decay time of pulses emitted by said vibrating system.

5. The invention set forth in claim 4 characterized in that said damping medium is constituted by a liquid.

6. The invention set forth in claim 4 characterized in that said damping medium comprises an oil impregnated fibrous material around at least part of each of said elements.

7. An electro-acoustical transducer comprising, in combination, an acoustic diaphragm having a pair of active sections, means providing a pair of housings each having a normally open end, said diaphragm being secured to said housings with said active diaphragm sections each closing off one of said normally open housing ends, a plurality of magnetostrictive elements in one of said housings secured to one of said diaphragm sections, a plurality of magnetostrictive elements in the other of said housings secured to the other of said diaphragm sections, a separate winding associated with each one of said elements in each of said housings, and a damping medium in only one of said housings surrounding the magnetostrictive elements therein for damping vibration of said last named elements.

8. Signaling apparatus comprising, in combination, a pair of electro-acoustical transducers coupled together for operation as a unit and each including an acoustic diaphragm, a plurality of discrete magnetostrictive elements, said elements being secured to their respective diaphragms, a separate winding associated with each one of said elements, and damping means associated with the magnetostrictive elements of only one of said transducers whereby said last named transducer is effective over relatively short distances, the other of said transducers being effective over relatively longer distances.

9. In signaling apparatus useful for soundings over both long and short distances, the combination of means providing a housing normally open at one end and including a closure at its other end, an acoustic diaphragm secured to said housing and closing off said normally open end, a plurality of magnetostrictive elements within said housing secured to said diaphragm, said diaphragm and said magnetostrictive elements constituting a vibrating system resonant at some particular frequency and the pulses emitted by said system normally having a relatively long decay time, a separate winding associated with each one of said elements for effecting vibration of said system when supplied with signal energy, a fluid damping medium within said housing surrounding said elements, said medium being effective to damp vibrations of said elements whereby to substantially reduce the decay time of pulses emitted by said vibrating system to thereby render said apparatus effective over relatively short distances, and means for removing said damping medium from said housing at will whereby to restore said relatively long decay time of pulses emitted by said vibrating system to thereby render said apparatus effective over relatively long distances.

10. In signaling apparatus useful for soundings over both long and short distances, the combination of means providing a housing normally open at one end and including a closure at its other end, an acoustic diaphragm secured to said housing and closing off said normally open end, a plurality of magnetostrictive elements within said housing secured to said diaphragm, said diaphragm and said magnetostrictive elements constituting a vibrating system resonant at some particular frequency and the pulses emitted by said system normally having a relatively long decay time, a separate winding associated with each one of said elements for effecting vibration of said system when supplied with signal energy, a fluid damping medium, and means for either introducing said damping medium at will into said housing around said elements for damping vibration of said elements whereby to substantially reduce the decay time of pulses emitted by said vibrating system to thereby render said apparatus effective over relatively short distances, or removing said damping medium at will from said housing whereby to restore said relatively long decay time of pulses emitted by said vibrating system to thereby render said apparatus effective over relatively long distances.

11. In submarine signaling apparatus useful for soundings in shallow water, the combination of means providing a closed housing including a vibratile wall, a plurality of magnetostrictive elements within said housing secured to said wall, said wall and said magnetostrictive elements constituting a vibrating system resonant at some particular frequency, a separate winding associated with each one of said elements for effecting vibration of said system when supplied with signal energy, and a damping medium within said housing surrounding said elements, said medium being effective to damp vibrations of said elements whereby to substantially reduce the decay time of pulses emitted by said vibrating system to thereby render said apparatus effective over relatively short distances.

LOY E. BARTON.
HORACE R. DYSON.